United States Patent
Orihara et al.

(10) Patent No.: US 8,745,855 B2
(45) Date of Patent: *Jun. 10, 2014

(54) METHOD FOR PRODUCING ANTENNA DEVICE

(75) Inventors: Katsuhisa Orihara, Tokyo (JP); Satoru Sugita, Tokyo (JP); Norio Saito, Tokyo (JP); Masayoshi Kanno, Tokyo (JP)

(73) Assignee: Dexerials Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,392

(22) Filed: Jan. 30, 2012

(65) Prior Publication Data

US 2012/0204414 A1    Aug. 16, 2012

Related U.S. Application Data

(63) Continuation of application No. PCT/JP2010/062617, filed on Jul. 27, 2010.

(30) Foreign Application Priority Data

Jul. 28, 2009   (JP) ................................ 2009-175750

(51) Int. Cl.
    *H01P 11/00*    (2006.01)
(52) U.S. Cl.
    USPC .......... 29/600; 29/592.1; 340/572.1; 343/722
(58) Field of Classification Search
    USPC ................ 29/600–601, 592.1, 593, 830–831, 29/846–847; 343/876, 700 MS; 340/572.1–572.7
    See application file for complete search history.

(56) References Cited

U.S. PATENT DOCUMENTS 5,566,441 A * 10/1996 Marsh et al. .................... 29/600
5,764,196 A *  6/1998 Fujimoto et al. ............. 343/867
6,164,551 A * 12/2000 Altwasser ..................... 235/492

(Continued)

FOREIGN PATENT DOCUMENTS

EP    1477927 A1    11/2004
EP    1560149 A2     8/2005

(Continued)

OTHER PUBLICATIONS

International Search Report issued in corresponding PCT Application No. PCT/JP2010/062617 dated Oct. 20, 2010 (4 pages).
Extended European Search Report issued in corresponding European Application No. 10804407.4 dated Jan. 2, 2013 (6 pages).

*Primary Examiner* — Minh Trinh
(74) *Attorney, Agent, or Firm* — Osha Liang LLP

(57) ABSTRACT

A method for manufacturing an antenna device is provided. The manufacturing method includes forming an antenna circuit so that the resonance frequency of the antenna circuit will be lower than an oscillation frequency of the reader/ writer and affixing a magnetic sheet to an antenna coil via an adhesive. The antenna circuit includes the antenna coil that receives the magnetic field transmitted from the reader/writer and a capacitor electrically connected to the antenna coil. The magnetic sheet is at a face-to-face position with respect to the antenna coil and is configured to change the inductance of the antenna coil. The adhesive is of a film thickness to change the inductance so that the resonance frequency of the resonance circuit will be coincident with the oscillation frequency depending on the spacing between the antenna coil and the magnetic sheet.

4 Claims, 5 Drawing Sheets

(56) References Cited

U.S. PATENT DOCUMENTS

| | | |
|---|---|---|
| 6,229,444 B1 * | 5/2001 | Endo et al. ............... 340/572.6 |
| 2004/0140896 A1 * | 7/2004 | Ohkawa et al. ............ 340/572.1 |
| 2005/0122270 A1 * | 6/2005 | Yano et al. ................. 343/718 |
| 2006/0266435 A1 * | 11/2006 | Yang et al. ................. 148/105 |
| 2008/0070003 A1 * | 3/2008 | Nakatani et al. ............ 428/141 |
| 2009/0040734 A1 * | 2/2009 | Ochi et al. ................. 361/737 |
| 2009/0179812 A1 | 7/2009 | Nakamura et al. |
| 2010/0103055 A1 * | 4/2010 | Waku et al. ................ 343/702 |
| 2012/0227248 A1 * | 9/2012 | Orihara et al. ............... 29/593 |

FOREIGN PATENT DOCUMENTS

| | | |
|---|---|---|
| EP | 1814191 A2 | 8/2007 |
| JP | 2003188765 A | 7/2003 |
| JP | 2005210223 A | 8/2005 |
| JP | 2008109212 A | 5/2008 |
| JP | 2009111483 A1 | 5/2009 |
| WO | 2008105477 A1 | 9/2008 |

* cited by examiner

METHOD FOR PRODUCING ANTENNA DEVICE

FIELD OF THE INVENTION

This invention relates to a method for producing an antenna device that provides for a communication enabled state by electromagnetic induction between it and a transmitter that transmits a magnetic field.

The present application claims priority rights which are based on the Japanese patent application No. 2009-175750 filed in Japan on Jul. 28, 2009. The contents of the patent application of the senior filing data are to be incorporated by reference into the present patent application.

BACKGROUND OF THE INVENTION

In these days, the near field communication technology of signal transmission and reception by electromagnetic induction has been established and its use has extended in the form of tickets for public means of transit or electronic money. The function of near field communication tends to be loaded on mobile phones as well and its use in time to come is felt to be promising. The near field communication technology is not limited to proximity communication by electromagnetic induction, such that, in the field of logistics, an IC tag that enables read/write at a distance of several meters has been commercialized. The near field communication technology not only enables near field communication, but also provides for power transmission at the same time. Consequently, the technology may be implemented on an IC card which does not own its own power supply, such as a battery.

In a system that implements the above mentioned near field communication, near field communication and power transmission are effected between a reader/writer and a wireless data carrier. To this end, a capacitor for resonance is connected to a loop antenna, and the resonance frequency, as determined by a constant LC of the loop antenna and the capacitor, is tuned to a preset system frequency. By so doing, stabilized communication may be established between the reader/writer and the wireless data carrier at a maximized communication distance.

However, the constant LC of the loop antenna and the capacitor for resonance has a number of factors of variations and may not necessarily be set at a scheduled value. For example, in the wireless data carrier, the loop antenna is formed by a copper foil pattern to reduce the cost, such that the value of L is varied due to, for example, deviations in pattern widths. Similarly, the capacitor for resonance is formed with the use of a copper foil of an antenna board as an electrode and with the use of the resin of the board as a dielectric material, again to reduce the cost. Hence, the capacitance is changed with the width, length or the pitch of the copper pattern. On the other hand, a protective film is finally laminated on each of upper and Tower sides of the antenna board for use of the antenna board as an IC card. However, the capacitance is varied under the influence of the protective film. Thus, to take the frequency shift following the lamination of the protective film into account, the copper foil pattern is partially removed by way of prospective adjustment with a view to adjusting the electrode area as well as the capacitance value of the capacitor for resonance.

The above mentioned factors of variations may give rise to shifting of the resonance frequency to destabilize communication or to reduce the communication distance. To cope with such problem, Patent Document 1 shows, in connection with an antenna module, a method of adjusting the resonance frequency by adjustment of the capacitance of the variable capacitor to provide for stability in communication. The antenna module includes an antenna coil that receives magnetic fluxes output from the reader/writer and a resonance circuit that efficiently converts changes in the magnetic fluxes into an electrical voltage.

RELATED TECHNICAL DOCUMENTS

Patent Document

Patent Document 1: Japanese Laid-Open Patent Publication 2009-111483

DISCLOSURE OF THE INVENTION

Problem to be Solved by the Invention

The constant LC of the loop antenna and the capacitor for resonance has a number of variation factors, and is not necessarily at a targeted value. Hence, even with the use of the method for adjusting the resonance frequency as shown in Patent Document 1, the frequency deviations caused by various factors of variations of circuit characteristics of the antenna module fabricated may sometimes not readily be adjusted to within an optimum range. For example, the variable capacitor, which is formed of a ferroelectric material, and which has the capacitance varied at a low voltage, is beset with a problem that its capacitance is appreciably varied due to variations in the dielectric film thickness or in the electrode area.

The present invention has been made in view of the above described status of the related technique. It is thus an object of the present invention to provide a method for manufacturing an antenna device, according to which frequency deviations caused by the variable factors of variations may be adjusted to within an optimum range, after the device is about to be finished, thereby providing for stabilized communication.

SUMMARY OF THE INVENTION

As a means to accomplish the above object, the present invention provides a method for manufacturing an antenna device which, on receipt of a magnetic field transmitted at a preset oscillation frequency from a transmitter, is inductively coupled to the transmitter to provide for a communication enabled state. The method includes a first step of forming a resonance circuit, including an antenna coil that receives the magnetic field transmitted from the transmitter and a variable capacitance capacitor electrically connected to the antenna coil so that the resonance frequency of the resonance circuit will be lower than the oscillation frequency. The method also includes a second step of affixing a magnetic sheet to the antenna coil via an insulation material, in which the magnetic sheet is formed at a face-to-face position with respect to the antenna coil and is configured to change the inductance of the antenna coil. The insulation material is of a film thickness to change the inductance so that the resonance frequency of the resonance circuit is coincident with the oscillation frequency depending on the spacing between the antenna coil and the magnetic sheet.

According to the present invention, the resonance frequency of the resonance circuit when an antenna coil and a magnetic sheet are affixed together is adjusted so as to be coincident with the oscillation frequency of the transmitter. In this ease, the characteristic that the inductance of the antenna coil is varied with the spacing between the antenna coil and the magnetic sheet is exploited. It is thus possible with the present invention to manufacture an antenna device in which the frequency deviations caused by various factors of variations of circuit characteristics of the antenna module may be controlled, after its production process is about to be finished, so as to be within a range that allows for fine finishing adjustments, thus providing for stabilized communication.

BEST MODES FOR CARRYING OUT THE INVENTION

The modes for practicing the present invention will now be explained in detail in reference to the drawings. It is noted that the present invention is not limited to the embodiments as now explained and may be varied as desired insofar as such variations do not depart from the purport of the invention.
<Global Configuration>

Figure 1:
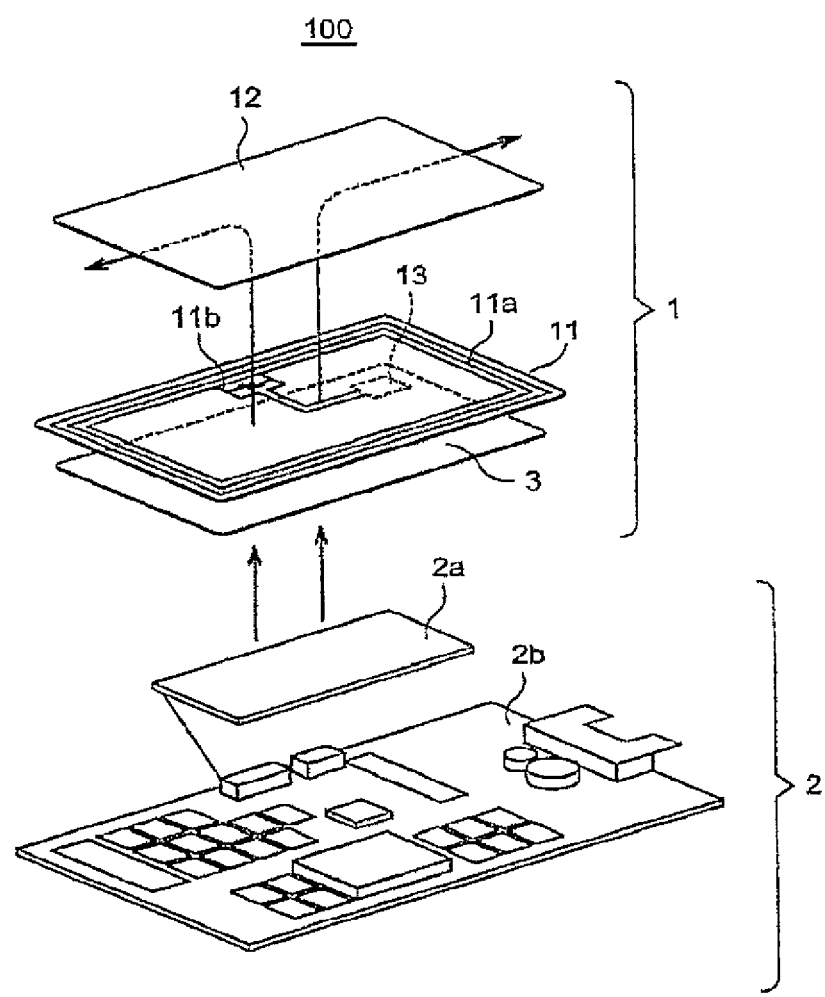
FIG. 1 is an exploded perspective view showing an entire configuration of a near field communication system.

An antenna module 1 according to the present invention is an antenna device that provides for a communication enabled state by electromagnetic induction between it and a transmitter that transmits an electromagnetic wave signal. The antenna module is used as it is built into a near field communication system 100 for RFID (Radio Frequency Identification) shown for example in FIG. 1.

The near field communication system 100 has the antenna module 1 embodying the present invention and a reader/writer 2 that accesses the antenna module 1.

The reader/writer 2 may operate as a transmitter that transmits a magnetic field to the antenna module 1. Specifically, the reader/writer includes an antenna 2a that transmits the magnetic field towards the antenna module 1, and a control board 2b that has communication with the antenna module 1, the control board is inductively coupled to via the antenna 2a.

That is, the reader/writer 2 includes the control board 2b electrically connected to the antenna 2a. On the control board 2b, there is implemented a control circuit including one or more electronic components, such as integrated circuit chip(s). The control circuit performs a variety of processing operations based on data received from the antenna module 1. For example, in writing data in the antenna module 1, the control circuit encodes data and modulates a carrier wave of a preset frequency, such 13.56 MHz, the encoded data. The control circuit amplifies the resulting modulated signal to drive the antenna 2a with the amplified modulated signal. In reading out data from the antenna module 1, the control circuit amplifies the modulated data signal, received over the antenna 2a, and demodulates the modulated data signal amplified to decode the demodulated data. It is noted that the control circuit uses an encoding system and a modulation system that are used in commonplace reader/writers. For example, the control circuit uses a Manchester coding system and an ASK (Amplitude Shift Keying) modulation system.

The antenna module 1, built within an enclosure 3 of an electronic device, includes an antenna circuit 11, a magnetic sheet 12 and a communication processor 13. The antenna circuit includes an antenna coil 11a which is mounted therein and which provides for a communication enabled state between the antenna module and the reader/writer 2. The antenna circuit is inductively coupled to the reader/writer. The magnetic sheet 12 is formed to lay on the antenna coil 11a to pull a magnetic field onto the antenna coil 11a, and the communication processor is driven by the current flowing through the antenna circuit to establish communication between the antenna module and the reader/writer 2.

The antenna circuit 11 is a circuit equivalent to a resonance circuit according to the present invention. The antenna circuit includes the antenna coil 11a, and a capacitor 11b electrically connected to the antenna coil 11a.

When the antenna coil 11a receives the magnetic field, transmitted from the reader/writer 2, the antenna circuit 11 is magnetically coupled by inductive coupling to the reader/writer 2. The antenna circuit thus is able to receive a modulated electromagnetic wave signal to deliver the received signal to the communication processor 13.

To pull the magnetic field, transmitted from the reader/writer 2, onto the antenna coil 11a, the magnetic sheet 12 is provided to lay on the antenna coil 11a. The magnetic sheet 12 varies the inductance of the antenna coil 11a in an increasing direction in comparison with a case where there is not provided the magnetic sheet. Specifically, the magnetic sheet 12 is affixed to a remote side of the antenna circuit when seen along the magnetic field radiating direction. By so doing, it is possible to suppress that the magnetic field transmitted from the reader/writer 2 is repelled backwards by metallic components provided within the enclosure 3 of the mobile electronic device as well as to suppress an eddy current from being produced.

The communication processor 13 is driven by the current flowing through the antenna circuit 11, to which it is electrically connected, in order to establish communication between it and the reader/writer 2. Specifically, the communication processor 13 demodulates the received modulated signal and decodes the demodulated signal to write decoded data in a memory 133, which will be explained subsequently. The communication processor 13 also reads out the data, which is to be transmitted to the reader/writer 2, from the memory 133, and encodes the read-out data to modulate the carrier wave with the encoded data. The communication processor 13 transmits the modulated electrical wave signal to the reader/writer 2 via the antenna circuit 11 to which the reader/writer 2 is coupled magnetically by inductive coupling.

Figure 2:
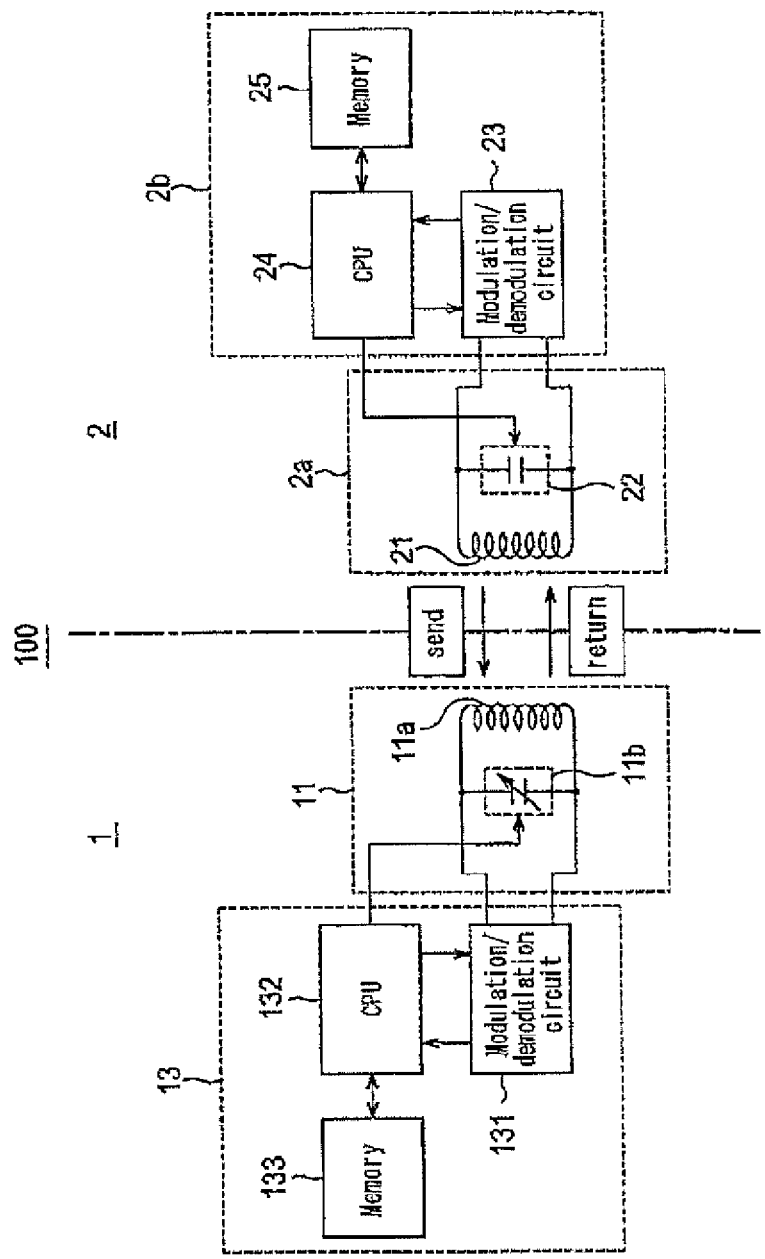
FIG. 2 is a schematic view showing a circuit configuration of the near field communication system.

In the near field communication system 100, constructed as described above, the specified circuit configuration of the antenna circuit 11 of the antenna module 1 will now be explained in reference to FIG. 2.

The antenna circuit 11 includes the antenna coil 11a and the capacitor 11b, as described above.

The antenna coil 11a is formed to, for example, a rectangular profile, and generates an inductive electromotive force in response to changes in the magnetic fluxes that are radiated by the antenna 2a of the reader/writer 2 and that are interlinked with the antenna coil 11a.

The capacitor 11b may have its capacitance adjusted by a control voltage output from the communication processor 13. Specifically, the capacitor 11b is a variable capacitance diode, known as 'Vari-Cap', or a variable capacitance capacitor formed of a ferroelectric material having high voltage ratings.

In the antenna circuit 11, the antenna coil 11a and the capacitor 11b are electrically connected to each other to form a resonance circuit. Owing to the variable capacitance of the capacitor 11b, it is possible to adjust the resonance frequency of the resonance circuit including the antenna coil 11a and the capacitor 11b.

The communication processor 13 is formed as a microcomputer made up of a modulation/demodulation circuit 131, a CPU 132 and a memory 133.

The modulation/demodulation circuit 131 modulates the carrier wave with data sent from the antenna circuit 11 to the reader/writer 2 to generate a modulated carrier wave by way of performing the processing for modulation. The modulation/demodulation circuit 131 also extracts the data from the modulated carrier wave output from the reader/writer 2 by way of performing the processing for demodulation.

The CPU 132 reads out the control voltage information stored in the memory 133 to apply a control voltage V to the capacitor 11b to adjust its capacitance. This compensates deviations in the resonance frequency ascribable to fabrication errors or variations of component elements.

In the memory 133, there is stored the control voltage information that controls the capacitance of the capacitor 11b so that the resonance frequency of the antenna circuit 11 will be coincident with the magnetic field transmitting frequency of the reader/writer 2. It is noted that in controlling the capacitance of the capacitor 11b, the deviations between the resonance frequency of the antenna circuit 11 and the magnetic field transmitting frequency from the reader/writer 2 are taken into consideration.

In the reader/writer 2 that has communication with the antenna module 1, configured as described above, the antenna 2a includes an antenna coil 21 and a capacitor 22, while the control board 2b includes a modulation/demodulation circuit 23, a CPU 24 and a memory 25.

The antenna coil 21 is formed to, for example, a rectangular profile, and is magnetically coupled to the antenna coil 11a of the antenna module 1 to transmit/receive data, such as commands or write data, as well as to deliver the power used in the antenna module 1.

The capacitor 22 is connected to the antenna coil 21 to compose a resonance circuit. The modulation/demodulation circuit 23 modulates the carrier wave with data to be delivered from the reader/writer 2 to the antenna module 1 by way of performing the processing for modulation. The modulation/demodulation circuit 23 also extracts the data from the modulated wave signal transmitted from the antenna module 1 by way of performing the processing for demodulation.

The CPU 24 controls the modulation/demodulation circuit 23 to deliver the data read out from the memory 25 to the antenna module 1, while performing the processing of writing the data demodulated by the modulation/demodulation circuit 23 in the memory 25.

The antenna circuit 11 of the antenna module 1 thus adjusts the capacitance of the capacitor 11b of the antenna circuit 11 by the control voltage controlled by the communication processor 13. The resonance frequency of the antenna circuit 11 may thus be brought into coincidence with the oscillation frequency of the reader/writer 2 to provide for stabilized communication.

<Adjustment of Resonance Frequency>

There are cases where, even lithe control voltage is applied to adjust the capacitance of the capacitor 11b, it is difficult to adjust the resonance frequency to within an optimum range by reason of frequency deviations caused by various factors of variations in the circuit characteristics of the antenna module 1 fabricated.

Figure 3:
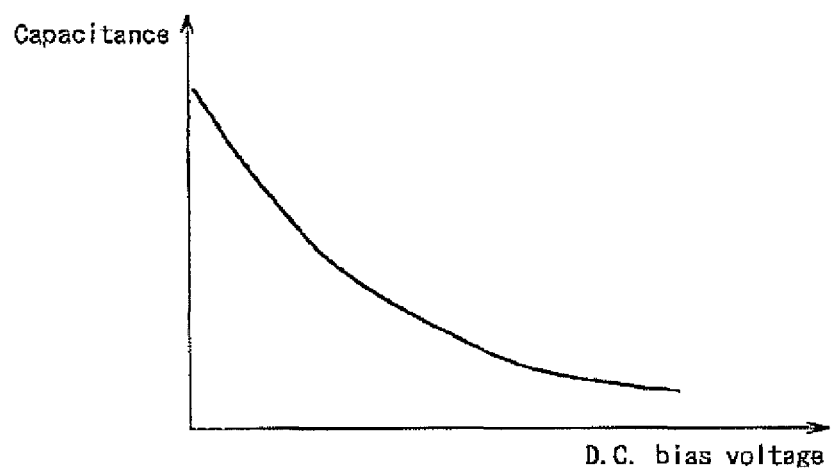
FIG. 3 is a graph showing changes in a characteristic of a variable capacitor of a ferroelectric material against the D.C. bias voltage.

For example, if a DC voltage is applied as a control voltage to a variable capacitance capacitor, formed of a ferroelectric material, the capacitance value is monotonously decreased with rise in the voltage value, as shown in FIG. 3. That is, in the resonance circuit having a variable capacitance capacitor, formed of a ferroelectric material, it is possible to adjust the resonance frequency in an increasing direction. It is however not possible to adjust it in a decreasing direction. For this reason, there are cases in which, if the resonance frequency is inherently deviated towards a high frequency side due to fabrication-related variation factors, it is difficult to adjust the resonance frequency to within an optimum range. In a majority of cases, it is desirable that the resonance frequency coincides with the oscillation frequency of the reader/writer when one-half the control voltage is applied. Thus, for the control voltage of 0V, the frequency is adjusted to a correspondingly lower value.

The inductance of an antenna coil is determined inter alia by the outer shape of the coil, number of turns of conductors and the conductor pitch. However, if a high relative permeability material is affixed to the antenna coil, the inductance of the antenna coil is also varied with the relative permeability, shape or thickness of the material or with the spacing between the antenna coil and the magnetic sheet. The relative permeability, shape and the thickness of the material are parameters determined at the time of designing and hence are unable to be modified. However, the spacing between the antenna coil and the magnetic sheet may be changed by adjustment at the time of affixing the magnetic sheet.

Hence, the manufacturing method according to the present embodiment exploits the characteristic that the inductance of the antenna coil is varied with the spacing between the antenna coil and the magnetic sheet. Such antenna module 1 is manufactured in which, when the magnetic sheet 12 is affixed to the antenna coil 11a, adjustment may be made so that the resonance frequency of the antenna circuit 11 will coincide with the oscillation frequency of the reader/writer 2. Before proceeding to description of the concrete manufacturing method for the antenna module 1, the characteristic that the antenna coil inductance is varied with the spacing between the antenna coil 11a and the magnetic sheet 12 will be explained.

Figure 4A:
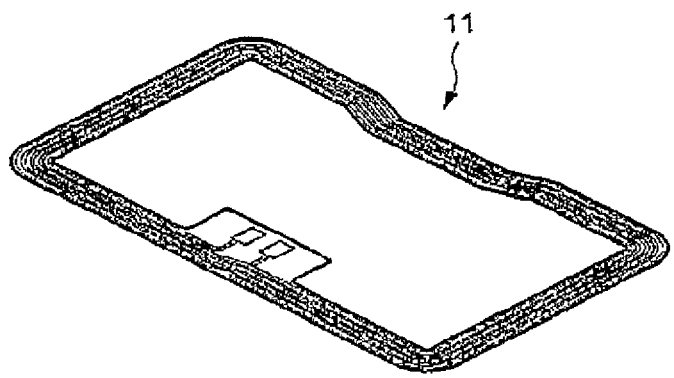
FIG. 4A is a perspective view showing an antenna coil with a magnetic sheet affixed thereto.
Figure 4B:
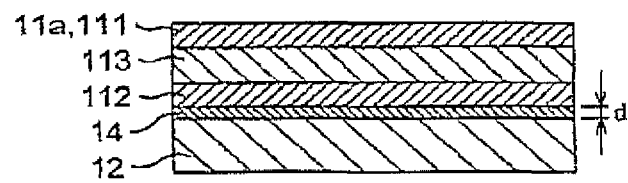
FIG. 4B is a cross-sectional view thereof.

FIGS. 4A and 4B are a perspective view and a cross-sectional view, respectively, showing the antenna coil 11a to which the magnetic sheet 12 is affixed via an adhesive 14 as an insulation material.

Referring to FIG. 4A, the antenna coil 11a is mounted on e.g., a printed circuit board in the following manner. That is, the antenna coil 11a is a flexible printed circuit board formed by a dielectric layer 113 both sides of which are covered with electrically conductive layers 111, 112. The dielectric layer 113 is formed of a flexible material, such as polyimide, liquid crystal polymer or Teflon (registered trade mark). The electrically conductive layer 111 is patterned, while the electrically conductive layer 112 is used as ground. In lieu of the above mentioned flexible printed circuit board, a rigid board, formed of a plastic material, such as epoxy resin, may also be used as the printed circuit board carrying thereon the antenna coil 11a. It is however preferred to use the flexible circuit board since it becomes possible in this case to suppress the dielectric constant relatively readily.

The magnetic sheet 12 is affixed via an adhesive 14 to the electrically conductive layer 112 operating as the ground for the antenna coil 11a.

Figure 5:
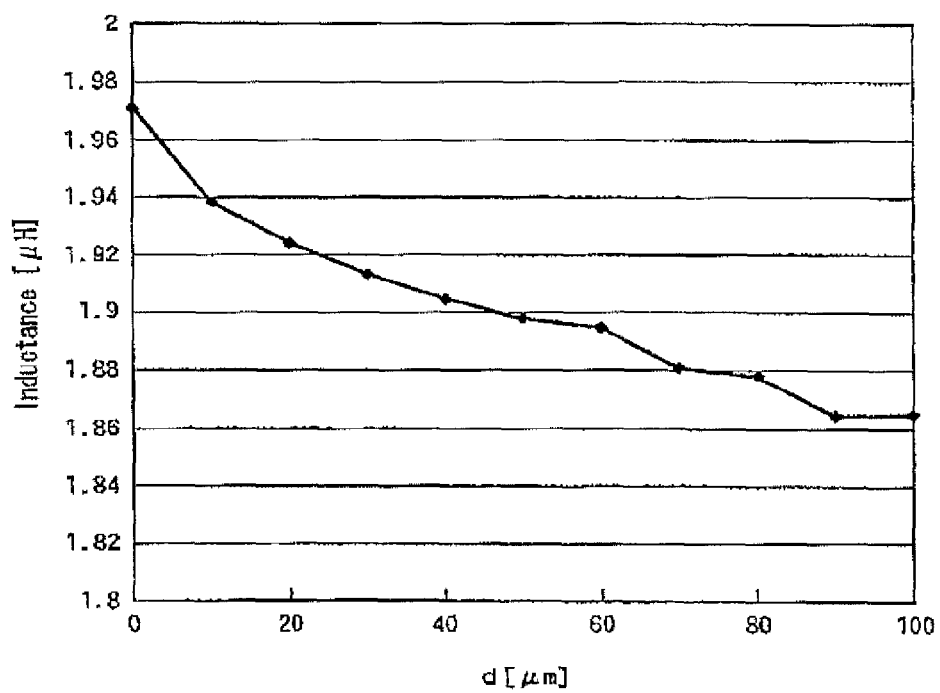
FIG. 5 is a graph for explanation of changes in inductance against the spacing between the antenna coil and the magnetic sheet.

FIG. 5 shows changes in inductance of the antenna coil in case a spacing d between the antenna coil and the magnetic sheet is changed in μm order as a unit. It is noted that a ferrite sheet having the following composition is used as the magnetic sheet 12.

That is, the ferrite sheet used has, as principal ingredients, 49.3 mol % of $Fe_2O_3$, 12.5 mol % of ZnO, 28.9 mol % of NiO and 9.2 mol % of CuO, while having, as additives, 1.10 mol % of $Sb_2O_3$ and 0.10 mol % of CoO.

Referring to FIG. 5, the inductance of the antenna coil 11a is monotonously decreased with the spacing d between the antenna coil 11a and the magnetic sheet 12. Although FIG. 5 shows inductance changes at 13.56 [MHz], it is explicit that, for other frequency ranges, the inductance of the antenna coil tends to decrease monotonously with increase in the spacing between the antenna coil and the magnetic sheet.

Figure 6A:
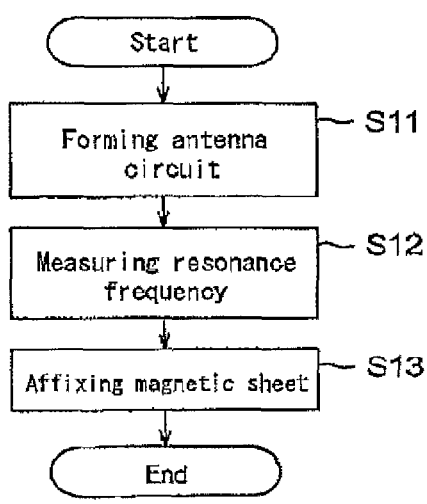
FIGS. 6A and 6B are flowcharts for explanation of a method for manufacturing an antenna module by exploiting the characteristic that the inductance of the antenna coil is varied with the spacing between the antenna coil and the magnetic sheet.
Figure 6B:
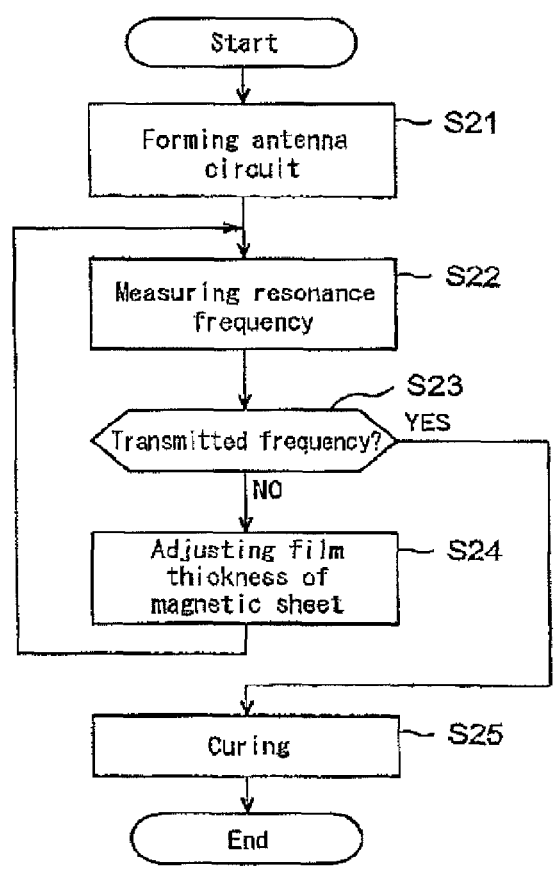

Referring to FIGS. 6A and 6B, the method for manufacturing the antenna module 1 by exploiting the characteristic that the inductance of the antenna coil 11a is changed with the spacing between the antenna coil 11a and the magnetic sheet 12, will now be explained.

Initially, a first manufacturing method will be explained in reference to FIG. 6A.

In a step S11, the antenna circuit 11 is fabricated as the characteristics of the antenna coil 11a and the capacitor 11b are set so that the resonance frequency of the antenna circuit 11 will be lower than the oscillation frequency of the reader/writer 2 which is e.g., 13.56 [MHz].

In a step S12, an actual value of the resonance frequency of the antenna circuit 11, manufactured by the step S11, is measured as a preset control voltage is applied to the variable capacitance.

In a step S13, the magnetic sheet 12 is affixed to the antenna coil 11a via an insulating adhesive. The film thickness of the adhesive is to be selected, based on deviations between the measured value of the resonance frequency obtained in the step S12 and the oscillation frequency of the reader/writer, so that, if the adhesive is applied to the so selected film thickness, the resonance frequency of the antenna circuit 11 will be coincident with the oscillation frequency of the reader/writer.

In the first manufacturing method, it is thus possible by the step S13 to manufacture the antenna module 1 in which the resonance frequency of the resonance circuit obtained on affixing the antenna coil and the magnetic sheet together via the insulation material coincides with the oscillation frequency of the reader/writer 2. In particular, in the first manufacturing method, a single process step of measuring the resonance frequency suffices, in contradistinction from the second manufacturing method, as now explained, thus shortening the manufacturing process.

Referring to FIG. 6B, the second manufacturing method will now be described.

In a step S21, the antenna circuit is fabricated as the characteristics of the antenna coil 11a and the capacitor 11b are set so that the resonance frequency of the antenna circuit 11 will become lower than the oscillation frequency of e.g., 13.56 [MHz].

In a step S22, an actual value of the resonance frequency of the antenna circuit 11, fabricated by the step S21, is measured as a preset control voltage is applied to the variable capacitance.

In a step S23, it is checked whether or not the measured value of the resonance frequency of the antenna circuit 11, obtained in the step S22, is coincident with the oscillation frequency of the reader/writer 2. If the result of the check indicates coincidence, processing transfers to a step S25. If otherwise, processing transfers to a step S24.

In the step S24, a thermosetting or UV curable adhesive is applied to the antenna coil 11a or to the magnetic sheet 12 so that the spacing between the antenna coil 11a and the magnetic sheet 12 will become greater stepwise with preset unit distance increments. The antenna coil 11a and the magnetic sheet 12 are thus affixed together. Processing then reverts to the step S23. It is noted that the adhesive is not to be limited to the above mentioned adhesive sorts provided that the adhesive used is curable by the curing process by the next step S25.

In the step S25, the processing of heating or UV irradiation is performed to cure the adhesive layer formed in the step S24 between the antenna coil 11a and the magnetic sheet 12.

Thus, in the second manufacturing method, the spacing between the antenna coil 11a and the magnetic sheet 12 is changed as the resonance frequency of the antenna circuit is measured. The adhesive is cured at an optimum value of the above mentioned spacing to maintain the shape of the resulting product. As a result, it is possible with the second manufacturing method to manufacture the antenna module 1 in which the resonance frequency of the antenna circuit has been adjusted into coincidence with the oscillation frequency of the reader/writer 2.

In particular, in the second manufacturing method, in contradistinction from the above mentioned first method, the spacing is changed as the resonance frequency is measured. It is thus possible to fabricate the antenna module 1 in which the resonance frequency of the antenna circuit has been adjusted more accurately into coincidence with the oscillation frequency of the reader/writer 2.

In the manufacturing method according to the present invention, the resonance frequency of the antenna circuit 11 at the time of affixing the magnetic sheet 12 to the antenna coil 11a is adjusted into coincidence with the oscillation frequency of the reader/writer 2. To this end, the characteristic that the inductance of the antenna coil 11a is changed with the spacing between the antenna coil 11a and the magnetic sheet 12 is exploited. Thus, in the manufacturing method of the present embodiment, the frequency deviations ascribable to various factors of variations of circuit characteristics of the antenna circuit 11 about to be finished may be controlled so as to be within the possible range of fine finishing adjustments. It is thus possible to manufacture the antenna module 1 capable of stabilized communication.

In more concrete terms, in the manufacturing method according to the embodiments of the present invention, the resonance frequency may be controlled to an optimum value by controlling the spacing between the antenna coil 11a and the magnetic sheet 12. In addition, in case the capacitor 11b is of a variable capacitance, the initial resonance frequency may be offset by a predetermined value to optimize the range of adjustment by the variable capacitance. It is thus possible to fabricate an antenna module of high performance as the degree of freedom in designing is maintained.

In the above described embodiments, the capacitor is formed of a ferroelectric material in which its capacitance is adjustable by the applied voltage. However, a variable capacitor unit, in which connections between neighboring capacitors of smaller capacitances, composing the variable capacitor unit, may be changed over by switching operations to yield a variable total capacitance, may also be used. In the latter case, frequency deviations caused by variations of circuit characteristics of the antenna module about to be finished may be controlled so as to be within the possible range of fine adjustments. Thus, even in such case, it is possible to fabricate an antenna module capable of stabilized communication.

The invention claimed is:

1. A method for manufacturing an antenna device that is inductively coupled to a transmitter on receipt of a magnetic field transmitted at preset an oscillation frequency from the transmitter to provide for a communication enabled state, the method comprising:
　　forming a resonance circuit including an antenna coil that receives the magnetic field transmitted from the transmitter and a variable capacitor electrically connected to the antenna coil so that a resonance frequency of the resonance circuit will be lower than the preset oscillation frequency; and
　　affixing a magnetic sheet to the antenna coil via an insulation material,
　　wherein the magnetic sheet is formed at a face-to-face position with respect to the antenna coil and configured to change an inductance of the antenna coil, and a thickness of the insulation material allows the inductance to change so that the resonance frequency of the resonance circuit is coincident with the oscillation frequency depending on a spacing between the antenna coil and the magnetic sheet, and
　　wherein the affixing of the magnetic sheet comprises:
　　　　measuring the resonance frequency of the resonance circuit; and
　　　　affixing the magnetic sheet to the antenna coil via the insulation material having the thickness which, based on measured results of the resonant frequency, will provide for the resonance frequency of the resonance circuit coincident with the oscillation frequency.

2. A method for manufacturing an antenna device that is inductively coupled to a transmitter on receipt of a magnetic field transmitted at preset an oscillation frequency from the transmitter to provide for a communication enabled state, the method comprising:
　　forming a resonance circuit including an antenna coil that receives the magnetic field transmitted from the transmitter and a variable capacitor electrically connected to the antenna coil so that a resonance frequency of the resonance circuit will be lower than the preset oscillation frequency; and
　　affixing a magnetic sheet to the antenna coil via an insulation material,
　　wherein the magnetic sheet is formed at a face-to-face position with respect to the antenna coil and configured to change an inductance of the antenna coil, and a thickness of the insulation material allows the inductance to change so that the resonance frequency of the resonance circuit is coincident with the oscillation frequency depending on a spacing between the antenna coil and the magnetic sheet, and
　　wherein the affixing of the magnetic sheet comprises:
　　　　affixing the antenna coil to the magnetic sheet via an adhesive, curable by preset curing processing, as the insulation material;
　　　　changing the spacing as the resonance frequency of the resonance circuit is measured; and
　　　　curing the adhesive to affix the antenna coil and the magnetic sheet together when the resonance frequency of the resonance circuit has become equal to the oscillation frequency.

3. The method according to claim 2, wherein the forming of the resonance circuit comprises using a capacitor formed of a ferroelectric material, and the capacitance of the capacitor decreases monotonously with rise in temperature.

4. The method according to claim 1, wherein the forming of the resonance circuit comprises using a capacitor formed of a ferroelectric material, and the capacitance of the capacitor decreases monotonously with rise in temperature.

* * * * *